US012711230B2

(12) United States Patent
Ezrielev et al.

(10) Patent No.: US 12,711,230 B2
(45) Date of Patent: Aug. 18, 2026

(54) RANSOMWARE DISCOVERY BY DETECTION OF TRANSMIT/OVERWRITE PROCESSES

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 223 days.

(21) Appl. No.: 18/295,366

(22) Filed: Apr. 4, 2023

(65) Prior Publication Data

US 2024/0338450 A1 Oct. 10, 2024

(51) Int. Cl.
*G06F 21/00* (2013.01)
*G06F 21/56* (2013.01)

(52) U.S. Cl.
CPC .......... *G06F 21/566* (2013.01); *G06F 21/565* (2013.01); *G06F 2221/034* (2013.01)

(58) Field of Classification Search
CPC . G06F 2221/034; G06F 21/565; G06F 21/566
USPC .......... 726/23
See application file for complete search history.

(56) References Cited

U.S. PATENT DOCUMENTS 11,170,104 B1 * 11/2021 Stickle .................. G06N 20/00
11,755,733 B1 * 9/2023 Armangau ........... G06F 21/568 726/23
2008/0052468 A1 * 2/2008 Speirs ................ G06F 13/4059 711/132
2017/0316047 A1 * 11/2017 Dubeyko .............. G06F 3/0659
2018/0351969 A1 * 12/2018 MacLeod .............. H04L 63/145
2019/0081983 A1 * 3/2019 Teal ........................ G06F 21/50
2020/0151120 A1 * 5/2020 Thyamagondlu ... G06F 13/4027
2023/0236992 A1 * 7/2023 Bruce .................... G06F 13/16 710/306

* cited by examiner

*Primary Examiner* — Josnel Jeudy
(74) *Attorney, Agent, or Firm* — Workman Nydegger

(57) ABSTRACT

One method includes detecting write operations requested by a process with respect to data, determining whether the data is being transmitted, by the same process, to a recipient that is unknown or unauthorized to receive the data, when it is determined that the data is being transmitted to the recipient that is unknown or unauthorized to receive the data, disabling writes to the data, for subsequent requested write operations, logging differentials associated with those subsequent requested write operations, and alerting a security protocol that the process is a suspected ransomware process.

20 Claims, 3 Drawing Sheets

RANSOMWARE DISCOVERY BY DETECTION OF TRANSMIT/OVERWRITE PROCESSES

FIELD OF THE INVENTION

Embodiments of the present invention generally relate to detection of malware, such as ransomware for example. More particularly, at least some embodiments of the invention relate to systems, hardware, software, computer-readable media, and methods, for detecting ransomware processes based on detection and observation of data transmission processes, and data overwrite processes.

BACKGROUND

Many typical ransomware attacks are implemented in two stages. In the first stage, data is sent out to the attacker, that is, to the ransomware process. In the second stage, the data on the host system is encrypted. While it may be possible to detect, and watch for, such encryption processes, which commonly involve write operations, it may not be possible to tell whether a particular operation being performed is part of an encryption process being carried out by ransomware.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
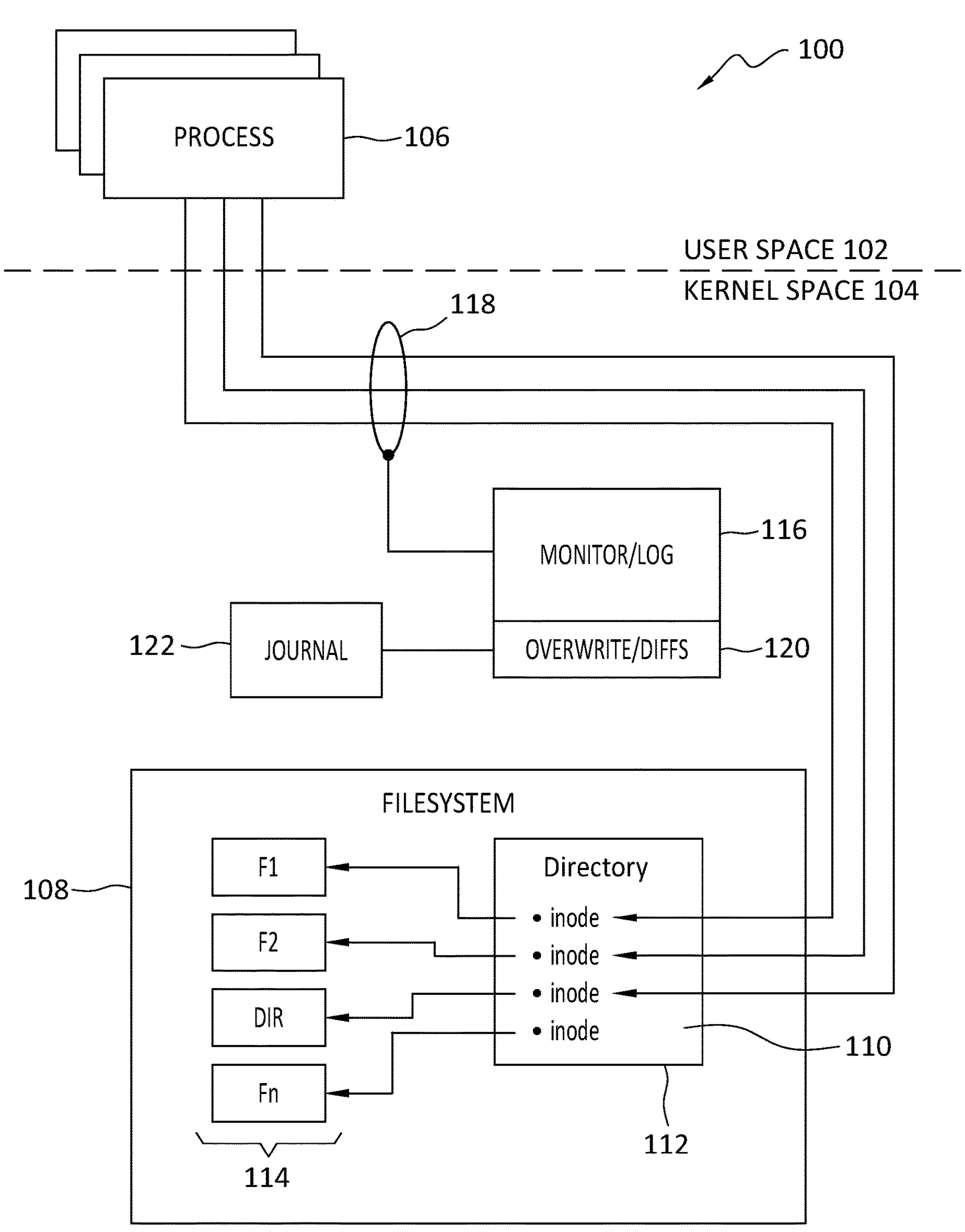
FIG. 1 discloses aspects of an example architecture and operating environment according to one embodiment.

Embodiments of the present invention generally relate to detection of malware, such as ransomware for example. More particularly, at least some embodiments of the invention relate to systems, hardware, software, computer-readable media, and methods, for detecting ransomware processes based on detection and observation of data transmission processes, and data overwrite processes.

One example embodiment comprises monitoring a process, which may or may not comprise a ransomware process, that comprises data write operations. When it is determined that the data, to which the write operations are directed, is being transmitted, such as by the same process requesting the write operations, to an unauthorized or unknown entity, the process may be identified as a suspect process, that is, a process that may comprise ransomware process. At this point at least, it may not have been determined whether or not the suspect process is actually a ransomware process. However, as a result of identification of the process as being suspect, the suspect process may be reported to existing security protocols, and overwriting of the data may be disabled to prevent the data from being compromised by the suspect process. After the overwriting of the data has been disabled, the changes requested in the write operations may instead be stored, in a journal for example, as 'diffs,' that is, the differences between the unwritten file and the file as it would exist if the requested write operations had been performed. If it is later determined that the process is a legitimate process, the owner of the data can apply the diffs to the data.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in anyway. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment the invention is that identification of a suspect process may be performed by monitoring processes that perform write operations and also transmit copies of the data that is being written to. An embodiment may enable identification of a process as a suspected ransomware process even though it may be unknown whether the process is performing data encryption operations such as are often indicative of a ransomware process. An embodiment may protect against a data encryption component of ransomware attacks. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, one or more embodiments of the invention may be implemented in connection with systems, software, and components, that individually and/or collectively implement, and/or cause the implementation of, data access operations. It is noted that, as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

An embodiment of the invention may be implemented in connection with a Unix® operating system. However, no particular operating system or environment is required for any embodiment. While reference is made herein to an example Unix© operating environment, but such reference is for the purposes of illustration and is not intended to limit the scope of the invention in any way.

With particular attention now to FIG. 1, one example of an operating environment for embodiments of the invention is denoted generally at 100. In general, the operating environment 100, which may comprise a Linux® environment in one embodiment, may comprise a user space 102 and a kernel space 104. One or more processes 106 may be running, or configured to run, in the user space 102. The processes 106 may communicate with a filesystem 108 to request access to assets, such as files and directories for example, of the filesystem 108.

In the example case of a Unix® based operating system, for example, each file may be indexed by a respective inode 110 listed in a directory 112. Inodes are special disk blocks that are created when the filesystem 108 is created. Each inode 110 stores the attributes and disk block locations of the object data. File-system object attributes may include metadata, such as times of last changes to the file, when the file was accessed, and when the file was modified, as well as information about the owner of the file, and file permission data indicating, for examples, which users are authorized to access the file, and for what purpose, such as read-only, or read-write. The directory 112 is an inode that contains a list of inodes 110 for each file and directory 114 that is located in the directory/inode.

The example architecture 100 may further comprise a monitor/log (ML) module 116 that may monitor write requests 118 directed by the processes 106 to the files and directories 114. Specifically, the ML module 116 may monitor an inode 110 of the file/directory 114 to which one or more write requests 118 are directed. The ML module 116 may also be able to determine when the write requests 118 include a request, such as a 'sendfile( )' request in the Linux® case, to send a file, or other grouping of data, to a recipient. The ML module 116 may further determine whether or not that recipient is an unknown or unauthorized recipient of the data. This determination may be made by checking a list or database of authorized IP addresses, and if an IP address of the intended recipient is not on the list, the ML module 116 or overwrite/diffs (OD) module 120 may disable writing at an OS level in the kernel space 104.

After writing has been disabled, the diffs implied by and/or extracted from the write requests 118 may be written to a journal 122, separate from the original file content. In this way, the changes requested by the write requests may be captured and logged, but the content of the file(s), or other data grouping(s), to which the write requests 118 are directed is not changed. If it is later determined that the process 106 is a legitimate process, a request for a file for which diffs were stored may cause the automatic application of the diffs to the original file content, and the file, with the diffs applied, will be returned to the requestor.

Thus, in an embodiment, ongoing writes may be captured, as diffs, and if it is determined later that the writing process is legitimate, it may be relatively easy to simply apply the diffs to the file(s) to which the write operations were directed. In this way, an embodiment may respond to the presence of a suspect process, that may or may not comprise ransomware, without unduly disrupting ongoing operations. On the other hand, if it is later determined that the suspect process was in fact a ransomware process, the diffs have not been applied to the file content, thus preventing encryption of the file content. Further, the captured diffs from the ransomware process may be analyzed later.

B. Example Methods

Figure 2:
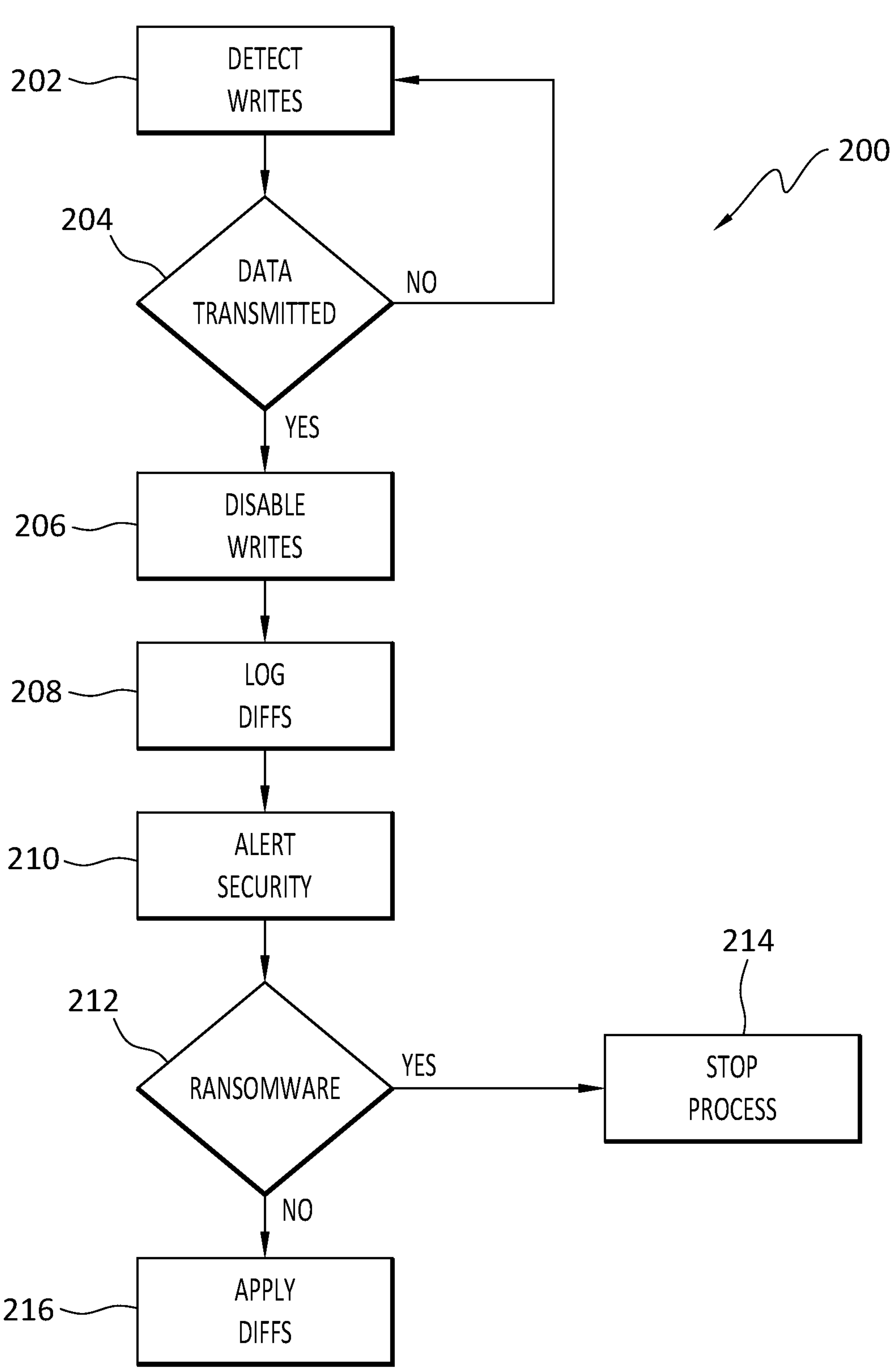
FIG. 2 discloses aspects of an example method according to one embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to an embodiment is denoted at 200. In an embodiment, the method 200 may operate to react to write operations, rather than trying to detect encryption operations. Thus, at an OS level in a kernel, for example, an embodiment may operate to log file or block reading that comprises part of a process in which those files, logs, or other data, are also transmitted to an outside entity, that is, an unknown or unauthorized entity. An embodiment may then log, such as for a defined period of time for example, which processes are trying to write to the data and, instead of overwriting the data according to write requests received from the suspect process, the method may disable writes, and record the diff in another place. If it is determined that a process, or group of processes, is acting in this way, an embodiment of the invention may alert existing security protocols. In an embodiment, where the suspect process is determined not to comprise a ransomware process, some or all of the changes reflected in the write requests received from the initially suspected process may be reverted, that is, the diffs may be applied to file content for example, and the updated file returned to a caller. Thus, an embodiment of the invention may provide protection against ransomware that operates by first transmitting the target data, and then encrypts the target data.

Turning now to FIG. 2, the example method 200 may be performed in whole or in part, such as by a dedicated module for example, in a kernel space of a Linux® environment. Such an operating environment is provided only by way of illustration however, and the scope of the invention is not limited to any particular operating environment(s).

The example method 200 may begin with the detection of writes 202, such as may be issued by a process of an application operating in a userspace, for example. Next, a determination may be made 204 as to whether the writes include, or imply, a request to transmit the data, to which the writes are directed, to a recipient. If there is no request to write, or if there is a request to write to a known/authorized recipient, the method may return to 202.

On the other hand, if it is determined 204 that there is a request to transmit the data to an unknown or unauthorized recipient, writing by the process may be disabled 206, and the process may be identified as a suspected ransomware process. Additionally, or alternatively, if it is determined 204 that the data has been, and/or is being, transmitted to such a recipient, writing by the process 206 may be disabled.

Note that at this juncture at least, there may as yet be no definitive determination as to whether or not the suspect process actually comprises ransomware. Thus, the disabling of writes 206 may constitute a proactive measure. After writing has been disabled 206, further write requests from the suspect process may not be permitted to modify the content of the file or other data to which the write requests are directed.

Instead, the diffs implicated by the write requests may be logged 208. In this way, the requested changes to the data can be tracked and retained, and possibly applied to the file or other data if it is later determined that the suspect process is actually a legitimate process. In an embodiment, security protocols may be notified 210 at some point after it has been determined 204 that there is a request to write to an unknown or unauthorized recipient.

Ultimately, a determination may be made 212 as to whether or not the suspect process comprises a ransomware process. If it is determined 212 that the suspect process is a ransomware process, that process may be stopped 214 and/or other actions may be taken to reduce, or eliminate, any impact of the ransomware process on the data. On the other hand, if it is determined 212 that the suspect process is not a ransomware process, or is unlikely to be a ransomware process, the diffs may be applied 216 to the file content, or other data, in response to a call for that file content or other data.

C. Further Example Embodiments

Following are some further example embodiments of the invention. These are presented only by way of example and are not intended to limit the scope of the invention in any way.

Embodiment 1. A method, comprising: detecting write operations requested by a process with respect to data; determining whether the data has been transmitted, by the process, to a recipient; when it is determined that the data is being transmitted to the recipient, disabling writes to the data; for subsequent requested write operations, logging differentials associated with those subsequent requested write operations; and alerting a security protocol that the process is a suspected ransomware process.

Embodiment 2. The method as recited in any preceding embodiment, wherein the process runs in a userspace.

Embodiment 3. The method as recited in any preceding embodiment, wherein the determining, the disabling, and the logging, are performed in a kernel space.

Embodiment 4. The method as recited in any preceding embodiment, wherein the suspected ransomware process is determined to be a ransomware process of a type in which data targeted by the ransomware process is first transmitted to an attacker, and then encrypted, by the ransomware process.

Embodiment 5. The method as recited in any preceding embodiment, wherein when the suspected ransomware process is determined to not be a ransomware process, the differentials are automatically applied to the data in response to a request for the data by a caller.

Embodiment 6. The method as recited in any preceding embodiment, wherein detecting write operations comprises monitoring respective inodes of one or more files.

Embodiment 7. The method as recited in any preceding embodiment, wherein the differentials are logged in a journal outside of the data to which the requested write operations are directed.

Embodiment 8. The method as recited in any preceding embodiment, wherein prior to determining whether the data is being transmitted, by the process, to a recipient that is unknown or unauthorized to receive the data, the data is modified according to prior write operations.

Embodiment 9. The method as recited in any preceding embodiment, wherein disabling writes to the data prevents encryption of the data by the suspected ransomware process.

Embodiment 10. The method as recited in any preceding embodiment, wherein the data comprises files and/or blocks.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

D. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform anyone or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
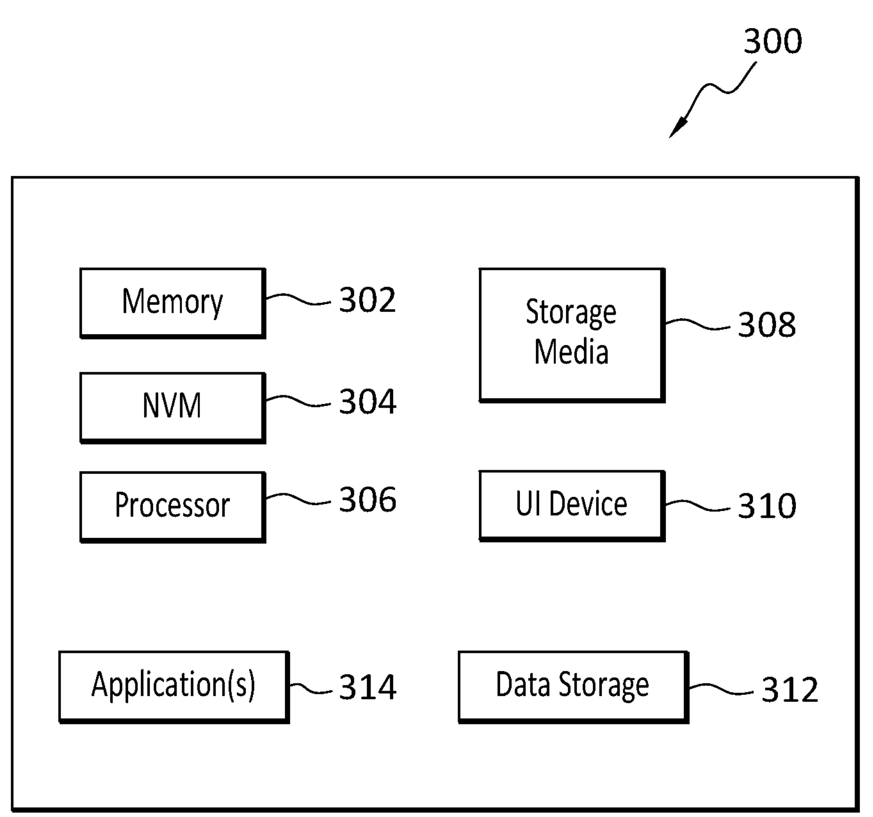
FIG. 3 discloses an example computing entity configured and operable to perform any of the disclosed methods, processes, and operations.

With reference briefly now to FIG. 3, any one or more of the entities disclosed, or implied, by FIGS. 1-2, and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

detecting write operations requested by a process operating in a userspace with respect to data in a computing system, wherein the write operations write changes to the data in a filesystem of the computing system;

determining whether the write operations to the filesystem include a request to transmit the data to an IP address, by the process, of a recipient that is unknown or unauthorized and external to both the userspace and the computing system, wherein the determining comprises monitoring the process and receiving information including the IP address included in the request;

when it is determined that the write operations include the request to transmit the data to the unknown or unauthorized recipient and the IP address is unauthorized, disabling the write operations to the data;

for subsequent requested write operations, logging differentials associated with those subsequent requested write operations, wherein the differentials include changes associated with the write operations; and alerting a security protocol that the process is a suspected ransomware process.

2. The method as recited in claim 1, wherein the process runs in the userspace.

3. The method as recited in claim 1, wherein the determining, the disabling, and the logging, are performed in a kernel space.

4. The method as recited in claim 1, wherein the suspected ransomware process is determined to be a ransomware process of a type in which data targeted by the ransomware process is first transmitted to an attacker, and then encrypted, by the ransomware process.

5. The method as recited in claim 1, wherein when the suspected ransomware process is determined to not be a ransomware process, the differentials are automatically applied to the data in response to a request for the data by a caller.

6. The method as recited in claim 1, wherein detecting the write operations comprises monitoring respective inodes of one or more files.

7. The method as recited in claim 1, wherein the differentials are logged in a journal outside of the data to which the subsequent requested write operations are directed.

8. The method as recited in claim 1, wherein prior to determining whether the write operations include the request to transmit the data, by the process, to the unknown or unauthorized recipient, the data is modified according to prior write operations.

9. The method as recited in claim 1, wherein disabling the write operations to the data prevents encryption of the data by the suspected ransomware process.

10. The method as recited in claim 1, wherein the data comprises files and/or blocks.

11. A non-transitory storage medium having stored therein instructions that are executable by one or more hardware processors to perform operations comprising:

detecting write operations requested by a process operating in a userspace with respect to data in a computing system, wherein the write operations write changes to the data in a filesystem of the computing system;

determining whether the write operations to the filesystem include a request to transmit the data to an IP address, by the process, of a recipient that is unknown or unauthorized and external to both the userspace and the computing system, wherein the determining comprises monitoring the process and receiving information including the IP address included in the request;

when it is determined that the write operations include the request to transmit the data to the unknown or unauthorized recipient and the IP address is unauthorized, disabling the write operations to the data;

for subsequent requested write operations, logging differentials associated with those subsequent requested write operations, wherein the differentials include changes associated with the write operations; and alerting a security protocol that the process is a suspected ransomware process.

12. The non-transitory storage medium as recited in claim 11, wherein the process runs in the userspace.

13. The non-transitory storage medium as recited in claim 11, wherein the determining, the disabling, and the logging, are performed in a kernel space.

14. The non-transitory storage medium as recited in claim 11, wherein the suspected ransomware process is determined to be a ransomware process of a type in which data targeted by the ransomware process is first transmitted to an attacker, and then encrypted, by the ransomware process.

15. The non-transitory storage medium as recited in claim 11, wherein when the suspected ransomware process is determined to not be a ransomware process, the differentials are automatically applied to the data in response to a request for the data by a caller.

16. The non-transitory storage medium as recited in claim 11, wherein the detecting write operations comprises monitoring respective inodes of one or more files.

17. The non-transitory storage medium as recited in claim 11, wherein the differentials are logged in a journal outside of the data to which the subsequent requested write operations are directed.

18. The non-transitory storage medium as recited in claim 11, wherein prior to determining whether the write operations include the request to transmit the data, by the process, to the unknown or unauthorized recipient, the data is modified according to prior write operations.

19. The non-transitory storage medium as recited in claim 11, wherein disabling the write operations to the data prevents encryption of the data by the suspected ransomware process.

20. The non-transitory storage medium as recited in claim 11, wherein the data comprises files and/or blocks.

* * * * *